United States Patent [19]

Moulios et al.

[11] Patent Number: 5,265,248

[45] Date of Patent: Nov. 23, 1993

[54] SYNCHRONIZATION OF MUSIC AND VIDEO GENERATED BY SIMULTANEOUSLY EXECUTING PROCESSES WITHIN A COMPUTER

[75] Inventors: Christopher J. Moulios; David M. V. Jones, both of Warren, Mich.; Kailash Ambwani, Hermosa Beach, Calif.

[73] Assignee: Gold Disk Inc., Mississauga, Canada

[21] Appl. No.: 621,177

[22] Filed: Nov. 30, 1990

[51] Int. Cl.⁵ .......................... G06F 9/00; G10F 1/00; G10G 1/00
[52] U.S. Cl. ................... 395/650; 364/DIG. 1; 364/281.3; 364/281.4; 364/281.8; 364/227.1; 364/225.5
[58] Field of Search ........................................ 395/650

[56] References Cited

U.S. PATENT DOCUMENTS 3,692,389 9/1972 Levy et al. .......................... 352/5
4,546,690 10/1985 Tanaka et al. ........................ 84/477

Primary Examiner—Gareth D. Shaw
Assistant Examiner—A. Katbab
Attorney, Agent, or Firm—R. Neil Sudol; Henry D. Coleman

[57] ABSTRACT

The invention relates to the synchronization of multimedia events on a computer. A computer of limited core or random access memory makes it difficult to run concurrently various media processes, such as video, music, and titling. The invention provides a way of loading such processes into such memory so as to approximate optimally the desired synchronized production when such processes are played. The invention also provides a way of parameterizing the play of the video process to the play of the music process.

8 Claims, 9 Drawing Sheets

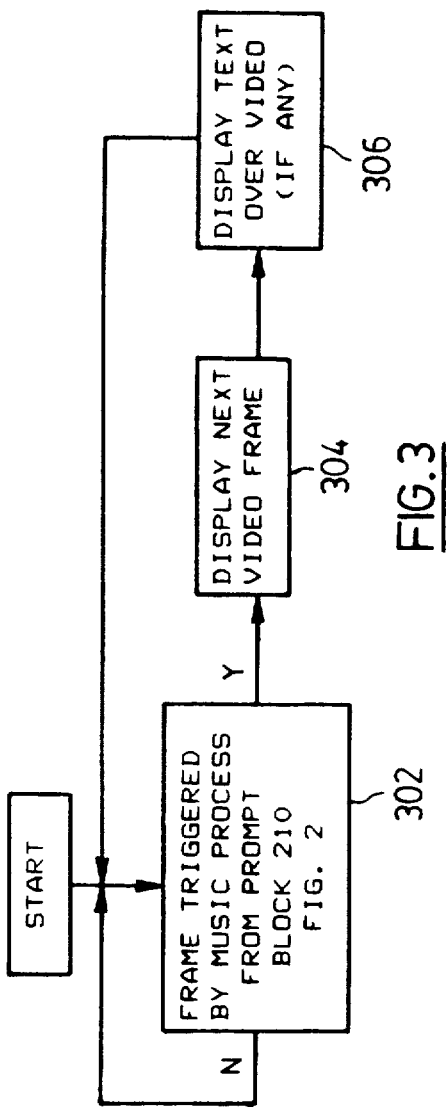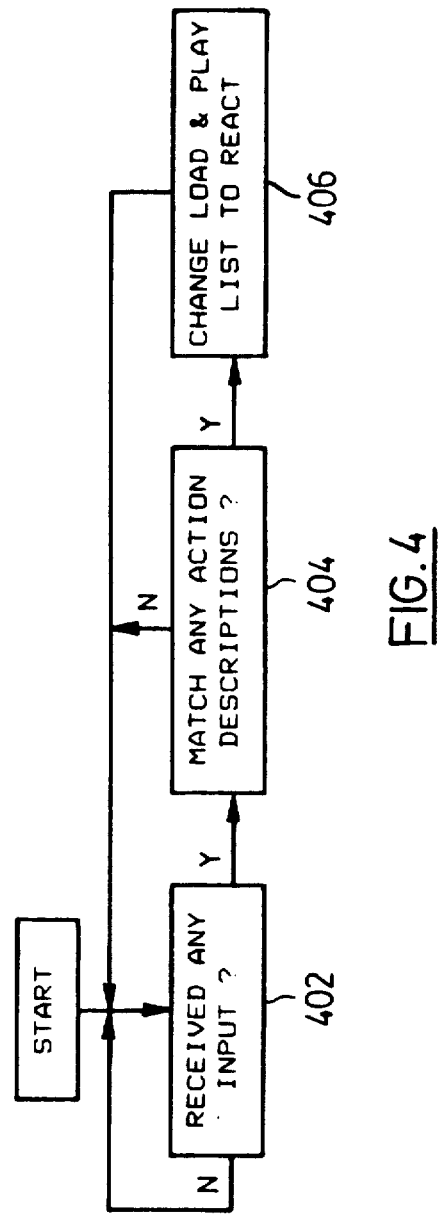

SYNCHRONIZATION OF MUSIC AND VIDEO GENERATED BY SIMULTANEOUSLY EXECUTING PROCESSES WITHIN A COMPUTER

FIELD OF INVENTION

This invention relates to a process of synchronizing processes involving audio and video media on a computer.

BACKGROUND OF INVENTION

The assembly and synchronous play of computer animation, picture stills, music, sound effects, and the like, require an enormous amount of Random Access Memory (RAM) or similar fast data storage. Most personal computers today, including those with as much as 8 megabytes of RAM, are unable to hold enough data for a complex five minute multi-media production. The conventional technique of swapping data between RAM and a fast I/O storage device creates pauses which destroy the desired synchronization. As well, the conventional technique of composing and playing a multi-stage presentation by repetitively loading into RAM and then playing a series of multi-media programs, creates severe pauses (due to the repetitive loading time) which destroy the desired synchronization.

SUMMARY OF THE INVENTION

According to the invention, there is provided a method of synchronizing the concurrent execution of two processes within a computer memory, the first process being a music process which operates on data convertible to sound signals to produce sounds, and the second process being a video process which executes on data convertible to visual images displayable on a monitor in the format of a sequence of frames, the method comprising the step of executing said video process to produce said sequence of frames at a speed according to a given relationship between frames and the tempo of the sounds being produced by said music process.

BRIEF DESCRIPTION OF THE DRAWINGS

A preferred embodiment of the invention will now be described, by way of example, with reference to the accompanying drawings, in which:

FIG. 3 is a flowchart of a video process;
FIG. 4 is a flowchart of a input process.

DETAILED DESCRIPTION OF THE PREFERRED EMBODIMENT

Figure 1:
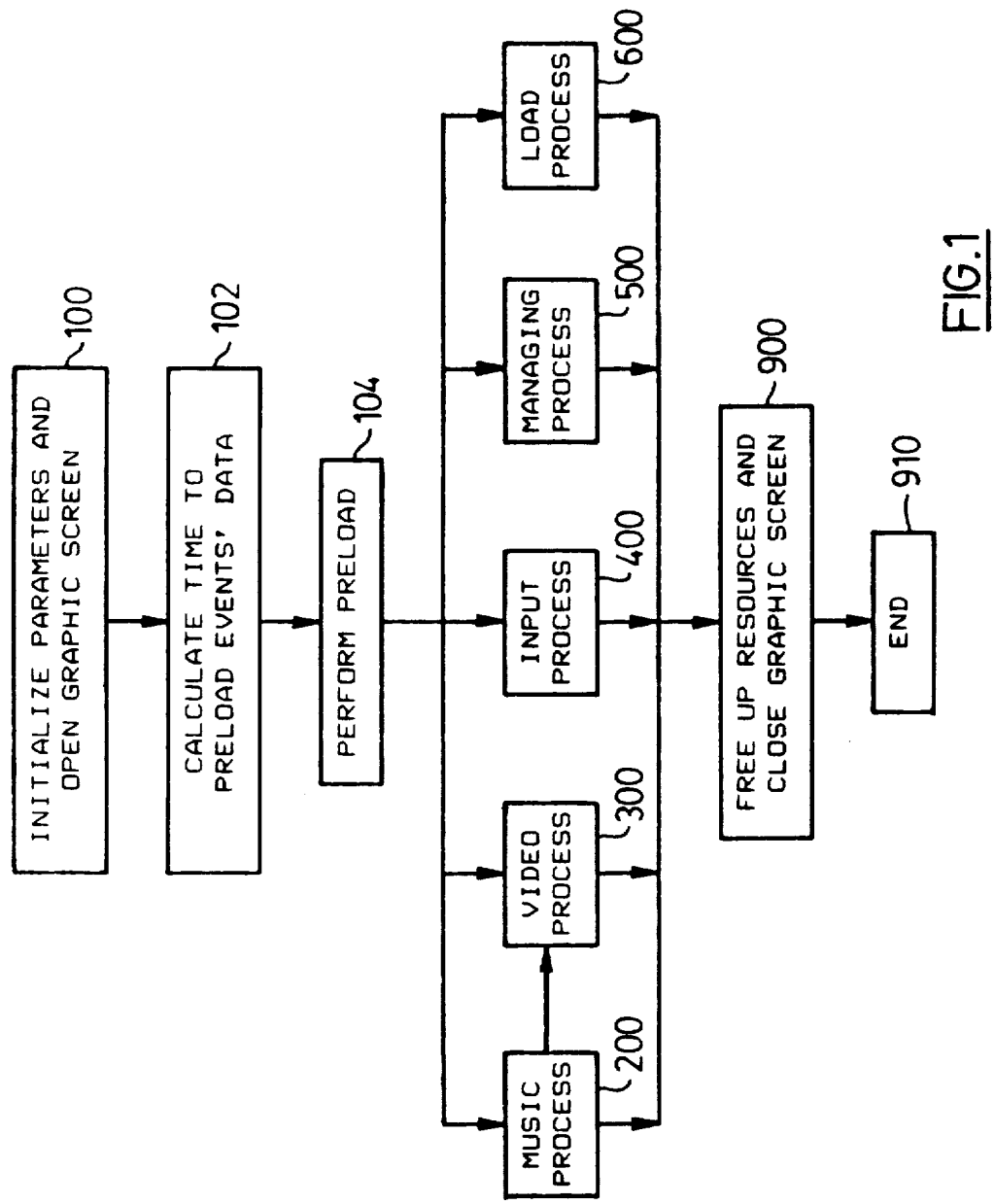
FIG. 1 is a flowchart of a synchronized play engine.

A description is provided with reference to a common personal computer sold by Commodore-Amiga, Inc. under the trademark AMIGA (hereinafter, Amiga computer), which is assumed for the purpose of this disclosure of the invention to be configured with (1) one megabyte of RAM, (2) a magnetic memory disk drive, (3) monitor, (4) keyboard, (5) four channel internal sound generating hardware, comprising a digital to analogue converter, (5) mouse or other conventional pointing device, (6) video port and (7) a port for communication with a musical instrument digital interface (MIDI) device, which device is available from a third party manufacture. The operating system of the Amiga computer allows the central processing unit (CPU) to operate, on a shared basis, various concurrently running processes. The Amiga personal computer supports commonly used color video protocols, mainly National Television Standard Committee (NTSC) or Phase Alternating Line (PAL) protocols. These protocols permit colour video signal interfacing with, for example, a conventional VCR or VCR camera.

Among the basic types of media processes which this invention can synchronize on the Amiga computer are: (1) video (animation, still pictures, and genlocked video signals generated from external devices, such as a video disk player and a VCR), (2) text or titling, (3) internally generated music or sound effects (SFX), (4) externally generated music via MIDI, (5) AREXX, (6) selected inputs from and outputs to external devices, like a video disc player and a slide projector. A brief description of these processes follows.

Animation is recognized as a sequence of video frames (to be distinguished from a NTSC or PAL frame). Each frame comprises graphic data representing the changes from the previous animation frame, except for the first frame, which is basically a still picture.

A generator locking device (Genlock) is a device which mixes computer images and video signals generated by, for example, a VCR or a VCR camera, and which can be connected to the Amiga computer throught its video port. Typically, Genlock is used to put titling, text or graphic images onto a video frame.

Sound or music may be produced internally by the Amiga computer's sound generating hardware operating on data comprising digitized instrument sounds. For example, a guitar may be played, sampled and digitized through commercially available programs, and then played back by the Amiga computer. Also, music can be generated externally. MIDI is a data protocol which permits synthesizers, sequencers, rhythm machines, computers and other musical devices to interconnect with, and drive, each other. Whether MIDI or internal, music data is always parameterized with a tempo, which is defined as beats per minute, and with a time signature.

AREXX is an inter-process communications language which permits concurrently running processes on the Amiga computer to communicate with each other (pass parameters, control each other, and the like).

Examples of input processes which can be synchronized to output processes are: a mouse input desiring the scroll of text on the monitor; or a slide projector signal indicative of the advance and display of next slide on the projector.

In the Amiga computer protocol, multi-media data is stored in IFF (interchange file format) files. Music data is stored in SMUS files, animation data in ANIM files and still pictures in ILBM (interleave bit map) files. An ANIM file is basically a ILBM file for the first frame, with a sequence of changes thereto for suceeding frames.

For a full understanding of the protocols, architecture and capabilities of the Amiga computer, reference should be made to the User's Manual for the Amiga computer and programming manuals, like the ROM Kernel Manuals (whether published by the manufacturer or third parties).

Among multi-media composers, it is common to use the terminology of "events"—music events, video events, and the like. For the purposes of the disclosure of this invention, it is more appropriate in places to use the terminology of "processes". The terms "events" and "processes" are roughly synonymous, but events are sometimes more appropriate to describe the output of the executed processes. Note that "processes" is being used in its ordinary sense, and not in the technical sense peculiar to the Amiga computer operating system context.

Common media input/output processes, and the data and parameters which they operate on, are as follows.

Video Process
Video data for example, animation or still)
Rate of play—# of frames per musical beat (usually a quarter note) or # of frames per second
Wipe type/wipe speed—for transitions on the monitor between events
Loop—start over when finished
Length (in frames)
Load Time—time necessary to load the data into RAM
Amount of RAM required
Text/Title Process
Text data
global text movement
font, size, color, and style, position on page
Music Process
data being Music Scores consisting of Music Data, in the form of a sequence of musical notes, each note being a digitized sound with a pitch parameter, the sequence having a stipulated tempo and time signature
Instrument type—MIDI or internal
Length (in measures)
Load Time—time necessary to load the data into RAM
Amount of RAM required
Sound Effects (SFX) Process
SFX data
Volume
Pitch
Channel
Load Time—time necessary to load the data into RAM
Amount of RAM required
Output or Remote Process
Receiving Device
Common commands, such as Rewind/Fastforward/-Frame Forward/Frame Backward, Play
Other Amiga programs
AREXX commands ?explain
Genlock Process
Background start
Foreground start
Background end
Foreground end
Input Process
List of input events
Action (e.g., keyboard, mouse, slide projector signal)
Reaction (a multi-media process with an output)

There are non-media processes required in the synchronization of the media processes—Managing Process, Loading Process Preloading Management Process and Memory Management Process, which in flowchart form can be found in FIGS. 5 through 8 and are explained in more detail below.

With the exception of an Input Process, the Music Process has the highest priority (for reasons given below) within the synchronization of media processes or events according to the present invention. The Loading Process has the lowest priority, since it spends most of the time waiting for disk access.

GRAPHICAL USER INTERFACE

Figure 9:
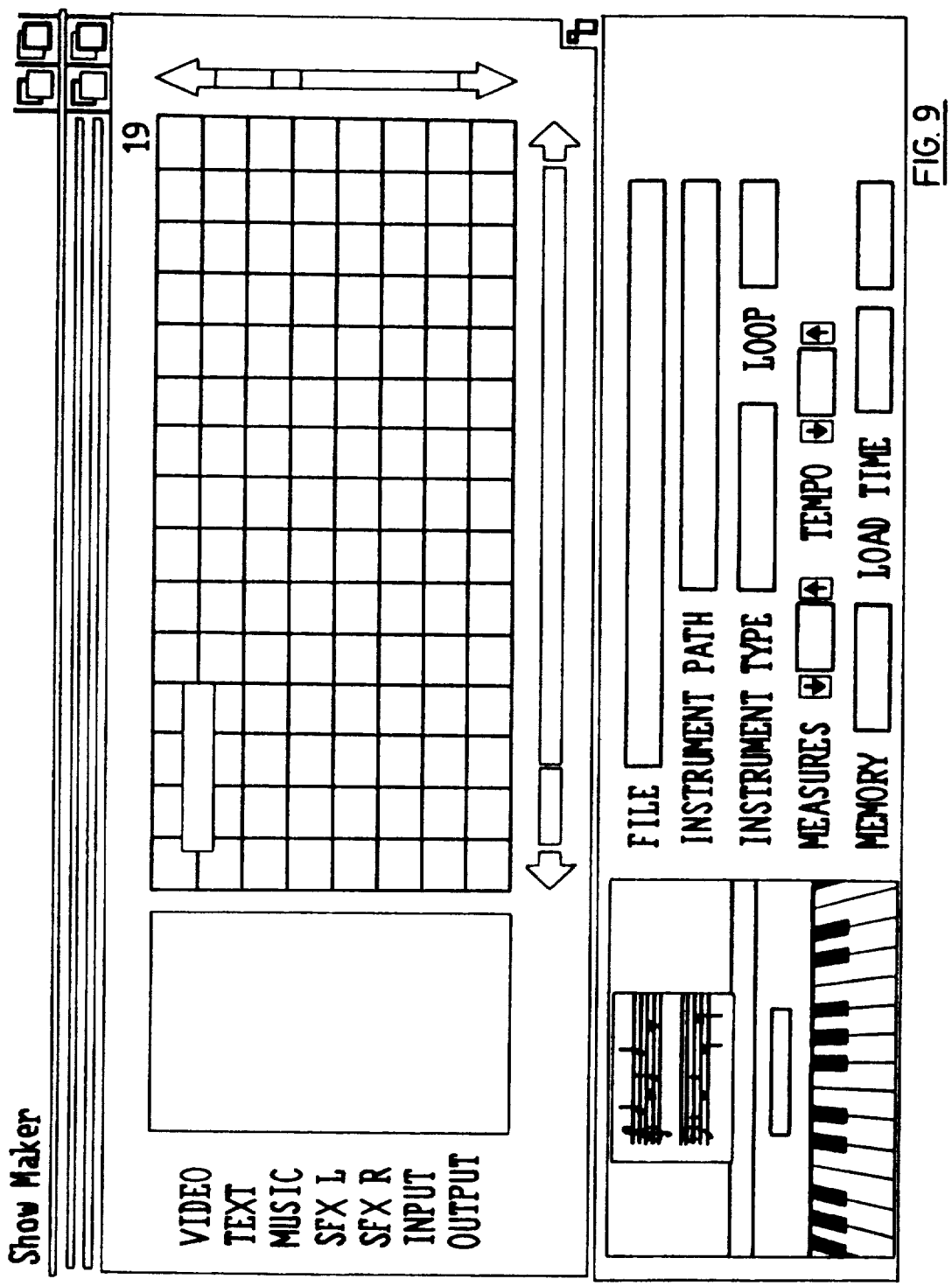
FIG. 9 is a diagram of a sample user interface suitable for the synchronization of a music and video process.

Production of a multi-media presentation begins by graphically composing the synchronization of media processes. Reference is made to FIG. 9, which illustrates a suitable graphical interface. The media input and output processes are aligned in the vertical direction, and their timing relationships (duration and relation to each other) are set out transversely along a horizontal timing reference. Thus each of the media processes or events is given a start time and end time in the production.

Several different timing references are possible. There is the absolute time reference (for example, one minute and three seconds into the event). There are also relative timing references, namely musical time (for example, measure 1, beat 3) or video or movie frames (for example, 13th frame). Entering processes involves the first step of designating the beginning of the event and the second step of designating the end of the event, both with respect to the selected time reference. Such designations can be achieved simply by common techniques, such as dragging and clicking a mouse. The user interface in FIG. 9 shows two of the media processes described above: the video event begins just before the first time measure and ends at the fourth; and the music event begins at the third time measure and ends between the fifth and sixth time measures.

The graphical representation of the duration of a process and its synchronization with other processes, as illustrated in FIG. 9, is converted into an Play List of Events, which is a singly linked, chronologically sorted, list of media events. Each event is characterized by a Start Event and an End Event instruction. For example, using an absolute time reference, an Events List may be: "—Start Animation #1 at 00:00—Start Midi Music #1 at 00:00—End Animation #1 at 00:50—Start Animation Still #2 at 00:50—Activate slide projector at 00:59—End Animation Still #2 at 1:00—End Midi Music #1 at 1:00".

Note that the selection of a process which requires to be loaded into RAM, causes the associated data to be loaded into RAM for the purposes of determining its Load Time.

GLOBAL CLOCK

There is a global clock that counts beats, which the Music Process can operate based on its time signature and tempo. The speed of the play of the Video Process (specifically the display of video frames) can be parameterized on a frames per beat basis or a frames per second basis. For example, in FIG. 9, the tempo may be set at, for example, 3 frames per beat, or 3 frames per second. On the frames per beat basis, the Video Process is driven by the global clock, as operated by the Music Process, if one is active.

SYNCHRONIZED PLAY ENGINE

Reference is made to FIG. 1. First, important parameters are initialized and the graphical user interface (for example, FIG. 9) is activated (Process Block 100). Then a calculation is made for the optimal loading into RAM of the data associated with the processes entered (Process Block 102). Then the initial events (including specifically the data therefor) are preloaded according to that calculation (Process Block 104). Then the Music Process (Process Block 200), Video Process (Process Block 300), Input Process (Process Block 400), Managing Process (Process Block 500), Load Process (Process Block 600), are activated if called for and are run concurrently and in a synchronous manner, in accordance with the production. Note that Music Process (Process Block 200) controls the Video Process (Process Block 300) in the sense aforedescribed, via control of the global clock. After all Processes are completed, there is a shut down (Process Blocks 900 and 910).

MUSIC PROCESS

All multi-media processes are driven by the Music Process. Accordingly, among the various concurrently running processes, the Music Process is accorded the highest priority. The Music Process is unique in that it can (and does, when active) modify the global clock, on which the Video Process and other processes are driven.

Figure 2:
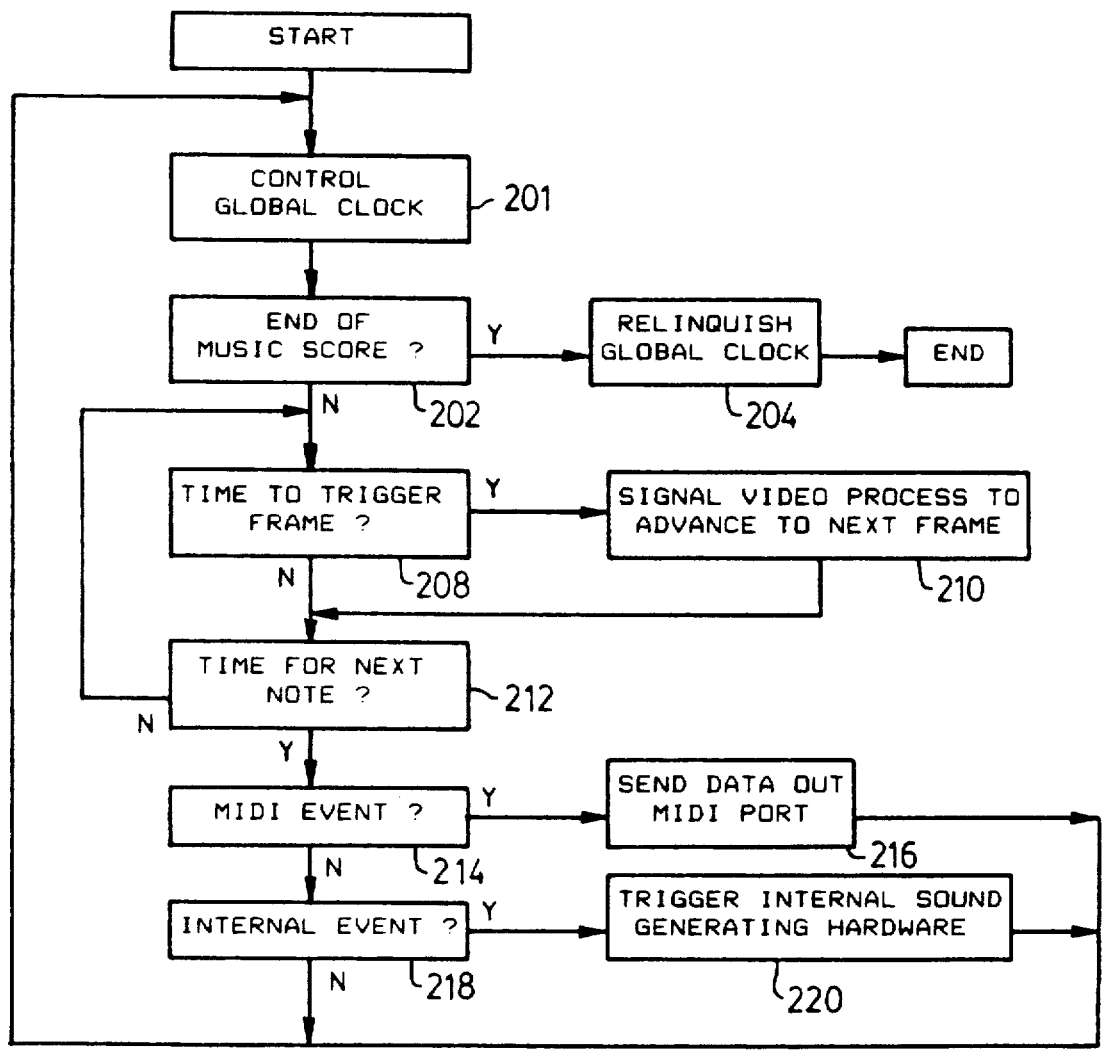
FIG. 2 is a flowchart of a music process.

Reference is made to FIG. 2. The Music Process operates on a Music Score, which is a singly linked list of musical notes. While the end of the Music Score has not been reached (Query Block 202), it operates the global clock according to the then active Music Score's tempo and time signature (Process Block 201), and determines if it is time to trigger the next video frame (Query Block 208). This determination is done on the chosen frames per beatrate of the video process. If it is time, then it signals the Video Process to advance to next frame (Process Block 210). In any case, it determines whether it is time for the play of the next note of the Music Score (Query Block 212). If it is time, then it determines if it is MIDI or internal (Query Blocks 214 and 218), and then initiates the appropriate activity, Process Blocks 216 and 220. If the end of the Music Score has been reached, then control of the global clock is relinquished (Process Block 204) and the global clock returns to its default tempo.

VIDEO PROCESS

Reference is made to FIG. 3. Video frames (which are displayed onto the monitor) are triggered by the Video Process (Process Blocks 302 and 304) according to the global clock controlled by the then active Music process. If there is any text to be displayed over the video frames, it is displayed (Process Block 306). If the musical tempo is changed by the Music Process, the frames will automatically be displayed proportionately slower or faster on the monitor.

INPUT PROCESS

Reference is made to FIG. 4. When an input has been received (Query Block 402) and there is a match with a predefined Action description (Query Block 404), then control is immediately, with highest priority overriding the Music Process, transferred to the execution of the predefined Reaction associated with that Action. For example, for the depression of the "A" key on the keyboard or the reception of a given note on the MIDI port, the Reaction may be a sequence of multi-media events, say a bomb exploding and a musical piece being played.

PROCESSES MANAGING PROCESS

Figure 5:
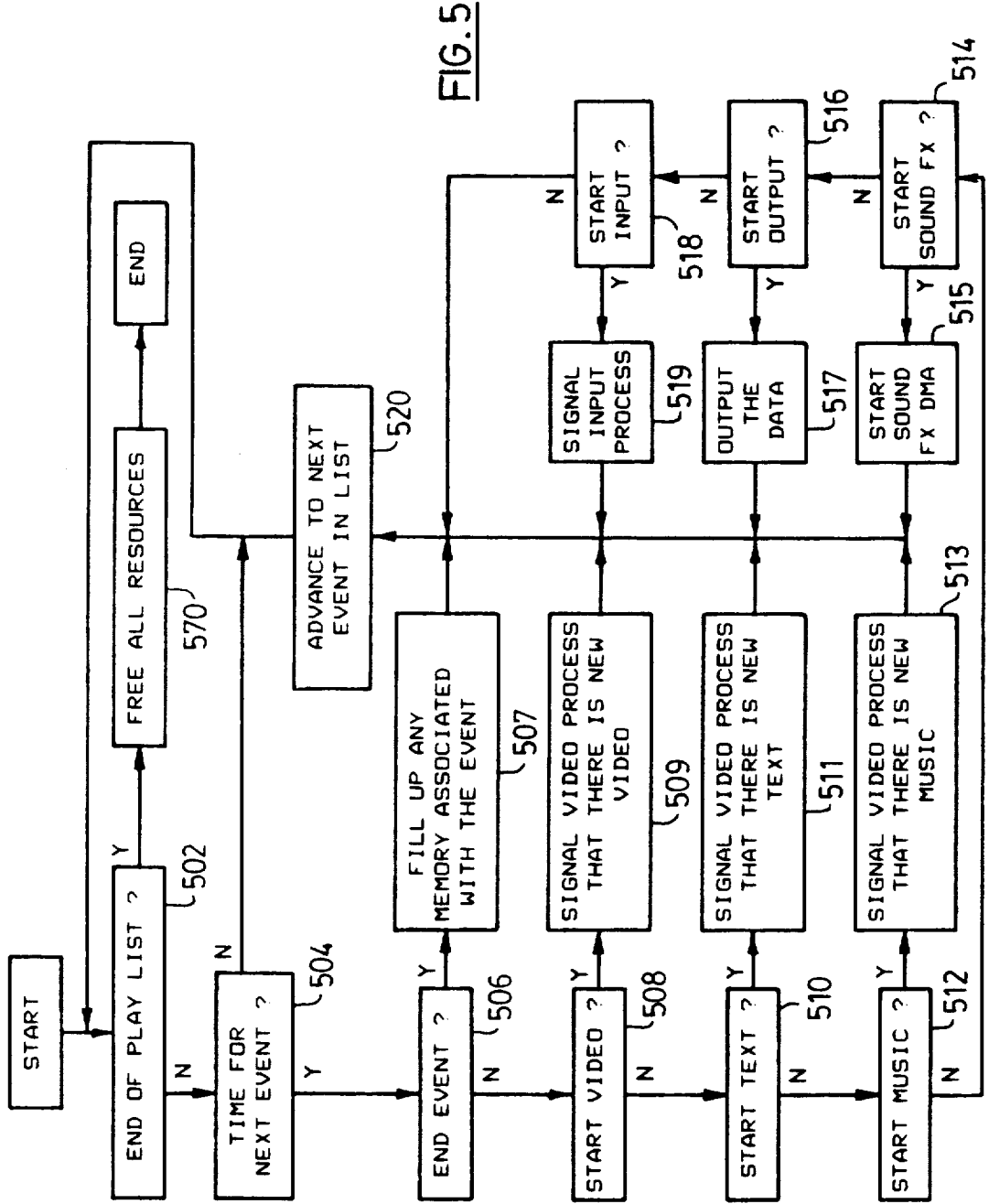
FIG. 5 is a flowchart of a managing process.

Reference is made to FIG. 5. There is a query to determine whether the end of the Play List of Events has been reached (Query Block 502). If so, all resources are freed (Process Block 570). If not, there is a wait for the next event (Query Block 504). The next event will either be an End Event (Query Block 506) or a Start Event for various activities like video, text, music, SFX, output and input (Query Blocks 506, 508, 510, 512, 514, 516, 518). In case of an End Event, all RAM associated with the (then finished) event is freed (Process Block 507) and then the next event on the Events List is considered (Process Block 520). Otherwise, the appropriate Start Event process is activated (Process Block 509, 511, 513, 515, 517, 519), and then the next event on the Events List is considered (Process Block 520).

LOADING PROCESS

Figure 6:
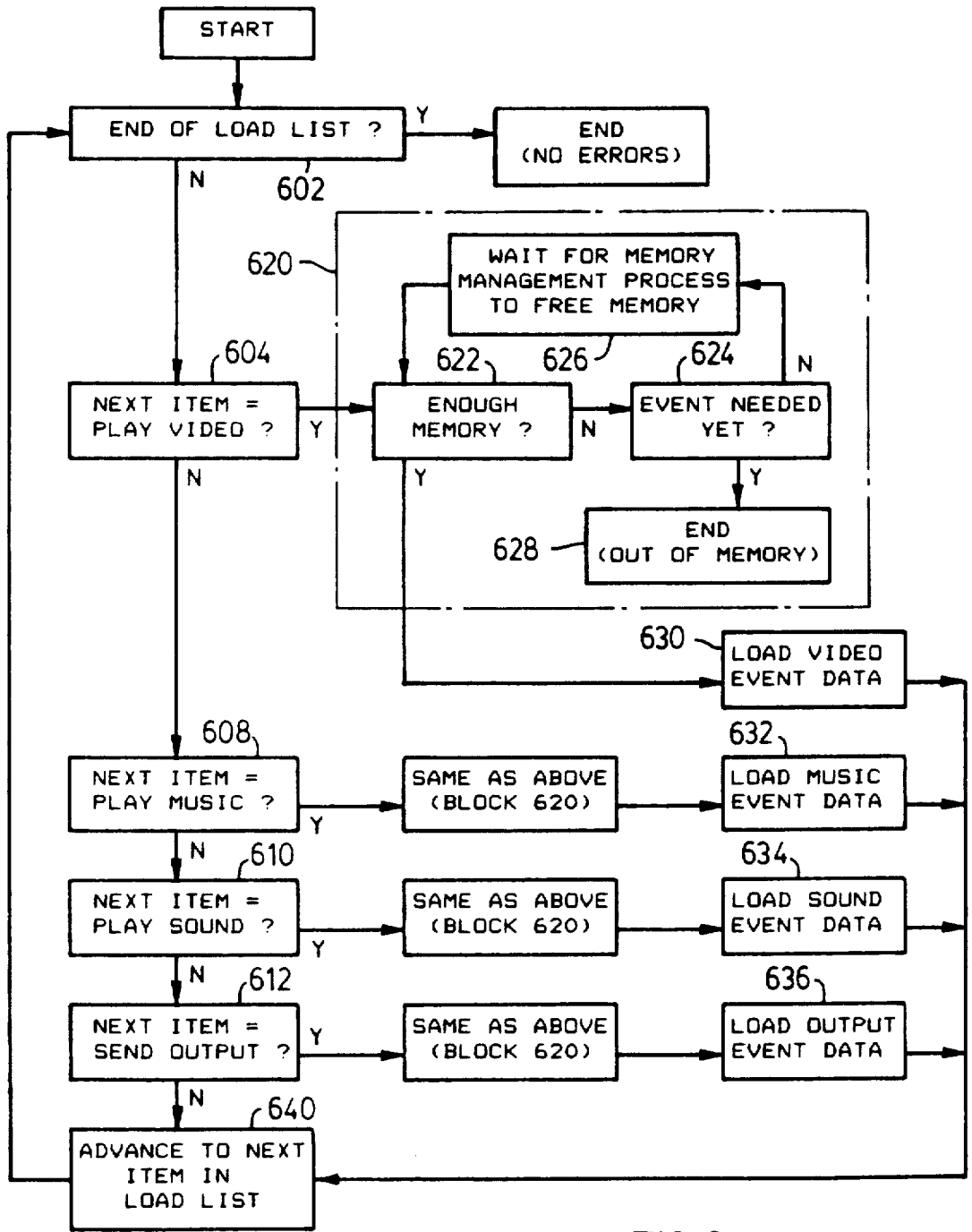
FIG. 6 is a flowchart of a loading process.

Reference is made to FIG. 6. The Load List is the list of events or processes, including their data, to be loaded into RAM, arranged in the order of the chronological positions within the production. While the end of the Load List not been reached (Query Block 602), it identifies the next item on the Load List (Query Blocks 604, 606, 608, 610 and 612) and attempts to load it into RAM. An item will be loaded only if there is sufficient memory (Query Block 620). If there is not, and the Managing Process does not immediately need that event, then the loading process waits for some process to terminate and free up sufficient memory (Query Blocks 622 and 624) by executing the Management Process (Process Block 626). After loading (Process Blocks 630, 632, 634 and 636), it advances to the next item on the Load List (Process Block 640). Note that if an event is needed and there is insufficient memory, then there will be a lapse in the desired synchronization of the events. The desired remedial action may be taken (Process Block 628), by for example, waiting, skipping the event, or signalling the end user.

PRELOADING PROCESS

Figure 7:
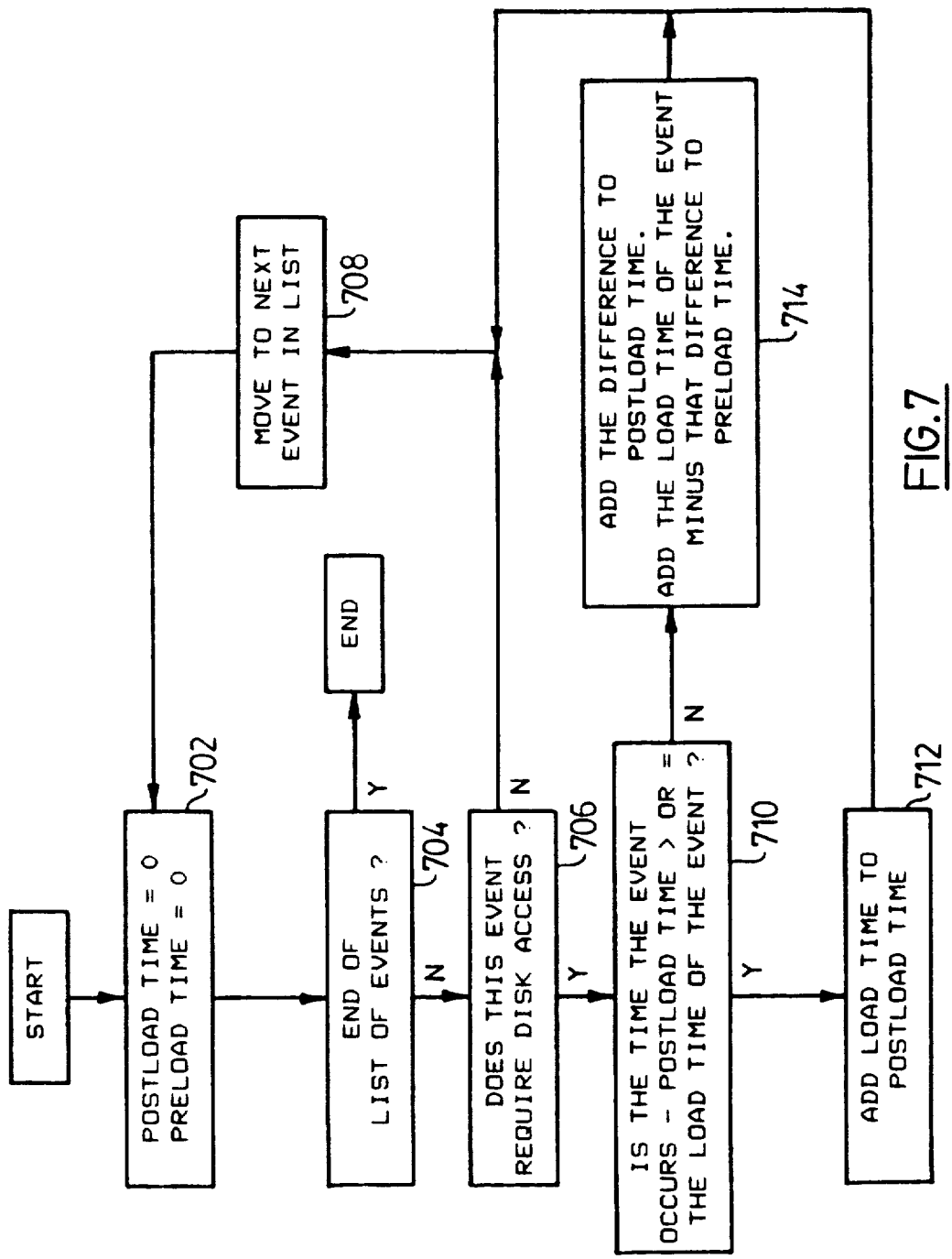
FIG. 7 is a flowchart of a preloading management process.

Reference is made to FIG. 7. The Preloading Process calculates the optimal loading of data associated with the multi-media production from disk into RAM.

Each multi-media process requires a certain time to load into RAM, which is a parameter of that process. As described above, the first time a process is loaded into RAM (typically when entered through the graphical use interface during the composition of the production), the loading is timed and stored as a parameter of that process as its Load Time, so that the preloading optimization process may use such parameter.

Two variables which are calculated, Preloadtime and Postloadtime, represent the Load Times before and after play begins of the Events List. They are initialized to zero (Process Block 702). Then, for each process in the Events List, while the end of that List is not reached (Query Block 704), it determines whether this process requires disk access for data (Query Block 706). If no disk access is required, it moves to the next event in the Events List (Process Block 708). If disk access is required, it determines if the time the process begins (with reference to 00:00) is greater than or equal to the Postloadtime plus the Load Time of that process (Query Block 710). If this time is zero or positive, then there is no need to load before playing that process and so the preloading process adds that Load Time to Postloadtime (Process Block 712) and consider the next event (Process Block 708). If the determination is negative, then: (1) it adds the absolute value of the difference between the time the process begins and the Postloadtime to Postloadtime and (2) adds the Load Time minus the difference to Preloadtime (Process Block 714), and (3) moves on to the next event (Process Block 708). Either way, it proceeds to the next process on the list (Process Block 708). The purpose of this Process is to minimize the Preloadtime.

Figure 10:
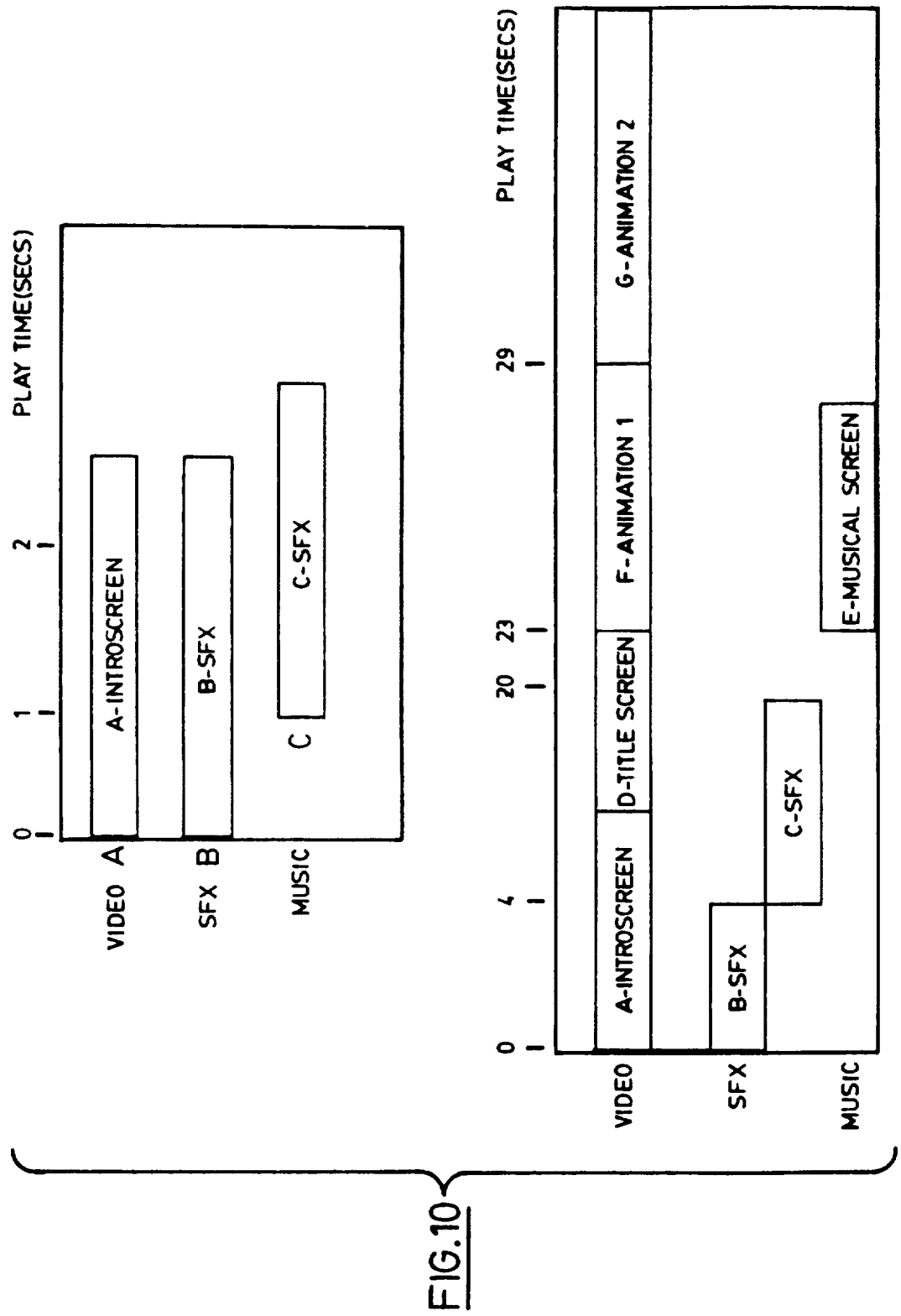
FIG. 10 shows two examples of the preloading management process.

The operation of the Preloading Process is illustrated below, with reference to the examples in FIG. 10.

EXAMPLE 1

| PROCESS | Load Time | PRELOAD | POSTLOAD | START TIME |
|---------|-----------|---------|----------|------------|
| A | 1 secs | 1 secs. | 0 secs. | at 00:00 |
| B | 1 | 2 | 0 | at 00:00 |
| C | 1 | 2 | 1 | at 00:04 |
| D | 3 | 2 | 4 | at 00:20 |
| E | 8 | 2 | 12 | at 00:20 |
| F | 10 | 2 | 22 | at 00:23 |
| G | 8 | 3 | 29 | at 00:29 |
| TOTAL Load Time: 32 seconds | | | | |

While the total Load Times of processes A through G is 32 seconds, it is seen that the calculation says that 3 seconds of preloading is appropriate.

EXAMPLE 2

| PROCESS | Load Time | PRELOAD | POSTLOAD | START TIME |
|---------|-----------|---------|----------|------------|
| A | 3 secs. | 3 secs. | 0 secs. | at 00:00 |
| B | 4 | 7 | 0 | at 00:00 |
| C | 10 | 15 | 2 | at 00:02 |
| TOTAL Load Time: 17 secs. | | | | |

It is seen that all of Processes A and B can be loaded into RAM and only 8 seconds of Process C need be preloaded before play of all of those processes can be started. There is sufficient time for the last two seconds of Process C to be loaded by the time it begins to be played.

MEMORY MANAGEMENT PROCESS

Figure 8:
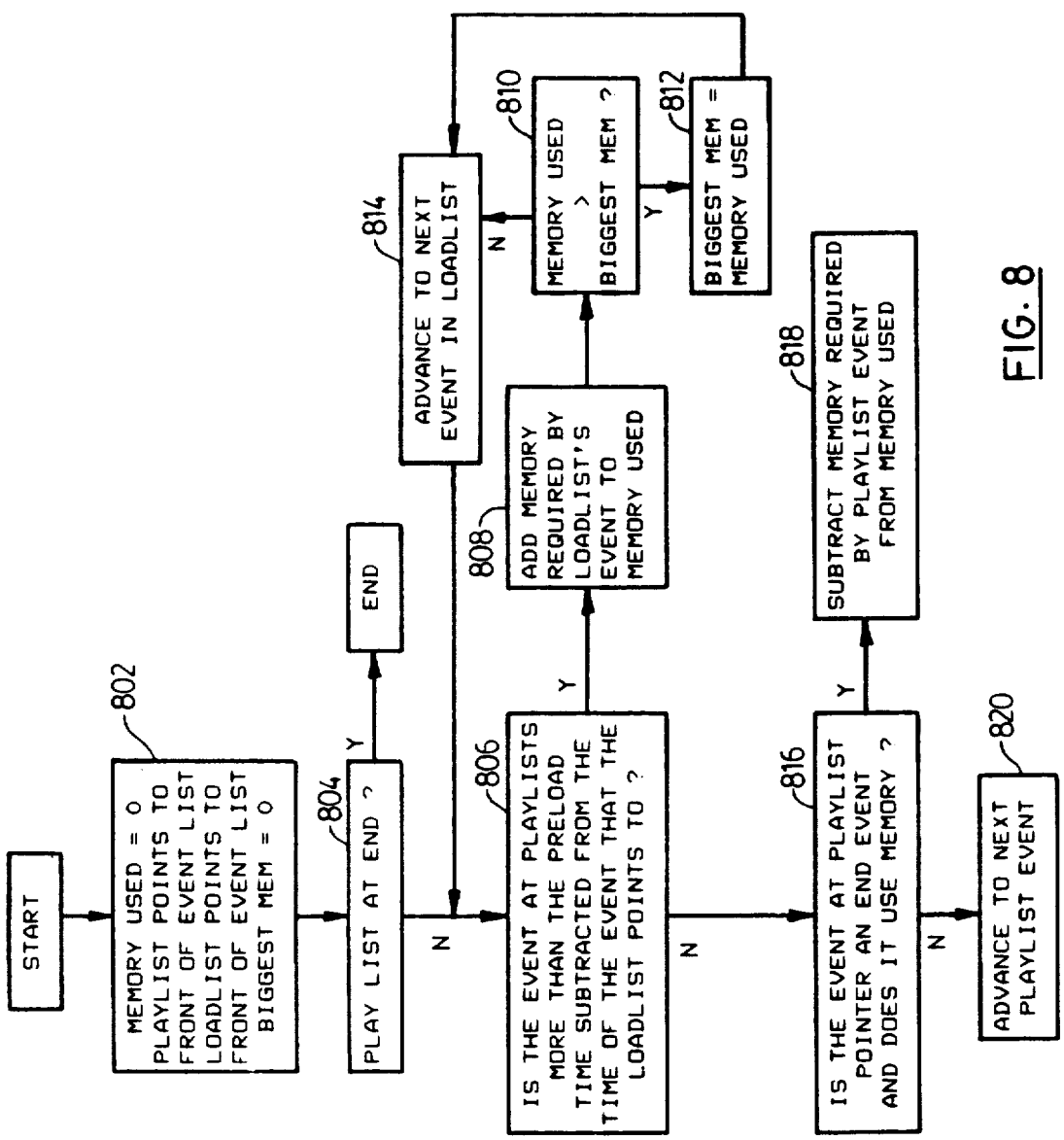
FIG. 8 is a flowchart of a memory management process.

Reference is made to FIG. 8. The end user uses the graphical user interface (for example, FIG. 9) to plan his production of multi-media processes. The memory management process determines the minimum amount of RAM required to execute the media processes synchronously as desired. This process requires the Play List of Events and the PreLoadtime and returns the minimum RAM required. This figure may be compared to the actual memory available in RAM and provide the appropriate warning if there is insufficient memory.

The variables Memoryused and Biggestmemory are initialized to zero. Playlist and Loadlist are both pointers initially pointing to the front of the Events List (Process Block 802). While Playlist is not at the end (Query Block 804), the process continues to check if the event at Playlist's time is more than the Preloadtime subtracted from the time of the event that Loadlist points to (Query Block 806)? If so, it adds the amount of memory required by Loadlist's event to Memoryused (Process Block 808). If Memoryused is greater than Biggestmemory (Query Block 810), then it sets Biggestmemory to be Memoryused (Process Block 812). Otherwise, advance to next event in the Loadlist (Process Block 814). If the event at Playlist's time is not more than the Preloadtime subtracted from the time of the event that Loadlist points to (Query Block 806), it determines whether the event at the Playlist pointer is an End Event and whether it uses memory (Query Block 816). If so, it subtracts memory required by the Playlist event from Memoryused (Process Block 818). If not, it advances to the next Playlist event (Process Block 820).

It will be apparent that the first time a production is played (execution of Process Blocks 200, 300, 400, 500, 600), the play may not be as smoothly synchronized as desired. The Load Time for each media processes in the production is calculated for the first time when each process is entered individually (via the graphical user interface, as described above). Because such initial Load Times are calculated for processes running in isolation, they tend to be underestimates-they are not running in the real context of the desired production, where there are concurrently running processes, some overlapping each other and each sharing computer CPU time and other resources. On the first play of the production, the Preloading Management Process will be operating with these initial, and likely underestimated, Load Times, and optimal preloading is likely not achieved. When the production is played a second time, the Load Times will be recalculated from the first play so that the Preloading Management Process will be operating on better values of the Load Times, and the consequent play will be smoother. It has been found that two or three iterations of the production often results in the desired, synchronized playback.

While the above description has been made with reference to an Amiga personal computer, it will be apparent to those programmers skilled in the art that the present invention may be advantageously applied to many other personal and larger computers. For example, the equivalents, for computers operating on the PC-MSDOS operating system, of the Amiga IFF files are GIF (graphics interface) or PIC (picture) or TIF. Nothing in the present invention turns on the protocol used for such files, except for implementation details easily within the skills of an ordinarily, skilled programmer.

It will also be appreciated that the above description relates to the preferred and alternative embodiments by way of example only. Many variations on the invention will be obvious to those skilled in the art, and such obvious variations are within the scope of the invention as described and claimed, whether or not expressly described.

What is claimed is:

1. A method for use with a computer, comprising the steps of:
   loading into a computer memory a first signal encoding a music process having a tempo expressed in beats per unit time;
   loading into said memory a second signal encoding a video process;
   automatically deriving from said tempo a timing parameter;
   generating a global clock signal having a frequency determined by said parameter;

operating said computer to convert said first signal in synchronism with said global clock signal via a sound producing peripheral to reproduce said music process in audible form; and simultaneously operating said computer to convert said second signal in synchronism with said global clock signal via a video producing peripheral to reproduce on a video monitor a sequence of frames of said video process triggered by said global clock signal at a rate proportional to said tempo during said music process.

2. The method defined in claim 1 wherein said video process is executed at a predetermined number of frames per beat of music process, said second signal encoding said predetermined number of frames.

3. The method defined in claim 2, further comprising the steps of:

loading into said memory a third signal encoding a sequence of consecutive music processes and a series of consecutive video processes to be executed under control of said computer;

loading the music processes and the video processes into said memory, in accordance with said third signal;

operating said computer to execute said sequence of music processes via said sound producing peripheral and said series of video processes via said video producing peripheral;

removing executed processes from said memory; and monitoring said memory for determining available memory space as said sequence and said series progress and processes are removed from said memory, the loading of said music processes and said video processes being implemented according to the availability of memory as said sequence and said series progress.

4. The method defined in claim 2, further comprising the steps of providing a default frequency for said global clock signal, said global clock signal having the frequency determined by said parameter during reproduction of said music process, further comprising the step of generating said global clock signal at said default frequency upon termination of reproduction of said music process.

5. The method defined in claim 1, further comprising the steps of:

loading into said memory a third signal encoding a sequence of consecutive music processes and a series of consecutive video processes to be executed under control of said computer;

loading the music processes and the video processes into said memory, in accordance with said third signal;

operating said computer to execute said sequence of music processes via said sound producing peripheral and said series of video processes via said video producing peripheral;

removing executed processes from said memory; and monitoring said memory for determining available memory space as said sequence and said series progress and processes are removed from said memory, the loading of said music processes and said video processes being implemented according to the availability of memory as said sequence and said series progress.

6. The method defined in claim 1, further comprising the steps of providing a default frequency for said global clock signal, said global clock signal having the frequency determined by said parameter during reproduction of said music process, further comprising the step of generating said global clock signal at said default frequency upon termination of reproduction of said music process.

7. The method defined in claim 1 wherein said music process comprises a plurality of digitally encoded parameters including tempo, time signature, musical notes each characterized by a respective pitch parameter, instrument type, and length in measures.

8. The method defined in claim 1 wherein said video process comprises a plurality of digitally encoded parameters including video frame data, rate of play, and length in frames.

* * * * *